(12) United States Patent
Goto et al.

(10) Patent No.: US 11,936,283 B2
(45) Date of Patent: Mar. 19, 2024

(54) GATE DRIVING POWER SOURCE DEVICE INCLUDING SHARED POWER SOURCE UNIT

(71) Applicant: Hitachi Astemo, Ltd., Hitachinaka (JP)

(72) Inventors: Masatoshi Goto, Shimotsuke (JP);
Yuta Nakamura, Utsunomiya (JP);
Yoshinori Sagiya, Shimotsuke (JP);
Kazunari Kurokawa, Oyama (JP);
Shugo Ueno, Utsunomiya (JP);
Shintaro Tai, Utsunomiya (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/528,731

(22) Filed: Nov. 17, 2021

(65) Prior Publication Data

US 2022/0166305 A1  May 26, 2022

(30) Foreign Application Priority Data

Nov. 25, 2020 (JP) ................................. 2020-195264

(51) Int. Cl.
| | |
|---|---|
| H02M 1/08 | (2006.01) |
| H02M 1/00 | (2006.01) |
| H02M 7/537 | (2006.01) |
| H02P 27/06 | (2006.01) |

(52) U.S. Cl.
CPC ............ H02M 1/08 (2013.01); H02M 1/0006 (2021.05); H02M 1/008 (2021.05); H02M 7/537 (2013.01); *H02P 27/06* (2013.01)

(58) Field of Classification Search
CPC ...... H02M 1/08; H02M 1/0006; H02M 1/008; H02M 1/088; H02M 1/32; H02M 1/007; H02M 1/084; H02M 7/537; H02M 7/53871; H02P 27/06; H02P 29/02; H02P 29/027; H02H 7/122
See application file for complete search history.

(56) References Cited

U.S. PATENT DOCUMENTS

| | | | |
|---|---|---|---|
| 2009/0174353 A1 | 7/2009 | Nakamura et al. | |
| 2012/0051099 A1* | 3/2012 | Funaba | H02M 1/08 363/21.17 |
| 2015/0085538 A1* | 3/2015 | Miyauchi | H02M 1/084 363/21.17 |
| 2019/0296653 A1* | 9/2019 | Asako | H02M 1/08 |
| 2022/0294334 A1* | 9/2022 | Kurokawa | H02M 1/08 |

FOREIGN PATENT DOCUMENTS

JP          2009130967 A       6/2009

* cited by examiner

*Primary Examiner* — Kyle J Moody
*Assistant Examiner* — Jye-June Lee
(74) *Attorney, Agent, or Firm* — CANTOR COLBURN LLP

(57) ABSTRACT

A gate driving power source device can be miniaturized by sharing power source units, and a large current can be prevented from locally flowing in a single chip even when a short-circuit failure occurs in a multi-phase conversion circuit included in a power conversion device. There is provided a shared power source unit supplying a shared DC power source to a gate drive circuit provided in any one of a plurality of lower arms of multi-phase conversion circuits or any one of a plurality of upper arms of the multi-phase conversion circuit and gate drive circuits provided in upper arms or lower arms of other conversion circuits.

12 Claims, 6 Drawing Sheets

GATE DRIVING POWER SOURCE DEVICE INCLUDING SHARED POWER SOURCE UNIT

CROSS REFERENCE TO PRIOR APPLICATIONS

The present invention claims priority under 35 U.S.C. § 119 to Japanese Patent Application No. 2020-195264, filed on Nov. 25, 2020, the entire content of which is incorporated herein by reference.

BACKGROUND OF THE INVENTION

Field of the Invention

The present invention relates to a gate driving power source device.

Description of Related Art

The following Patent Document 1 discloses a motor control device having gate drive circuits driving switching elements of respective arms of an inverter circuit. The gate drive circuits have gate drive circuits of upper arms (upper stage side gate drive circuits) and gate drive circuits of lower arms (lower stage side gate drive circuits). The foregoing motor control device includes a power supply circuit which individually supplies power to the upper stage side gate drive circuits and the lower stage side gate drive circuits. The power supply circuit in the foregoing motor control device includes a number of transformers according to the number (six) of gate drive circuits. This power supply circuit individually supplies power to each of the gate drive circuits by rectifying an output of each of the transformers.

PATENT DOCUMENTS

[Patent Document 1] Japanese Unexamined Patent Application, First Publication No. 2009-130967

SUMMARY OF THE INVENTION

The foregoing power supply circuit includes a power source generation circuit having a transformer and a rectification circuit for each of the gate drive circuits. The foregoing power supply circuit has a problem in that a mounting area (mounting volume) is comparatively large. For example, when a plurality of gate drive circuits driving a plurality of inverter circuits are mounted on one printed board, the number of power source generation circuits required is that obtained by multiplying the number of phases of the inverter circuits by the number of inverter circuits. For this reason, there is a problem that the size of the printed board will be large and the costs will be high. In order to resolve this problem, it is conceivable that a shared DC power source be supplied to a plurality of gate drive circuits from one power source generation circuit (power source unit).

For example, a three-phase inverter has a chip provided with one or more switching elements. When a short-circuit failure occurs in this chip, in order to prevent a large current from flowing in only the chip in which a short-circuit failure has occurred, it is preferable to perform three-phase short-circuit control for forcibly causing a different switching element to allow conduction. At this time, for example, if power is supplied to all the lower arms of the three-phase inverter from a single power source unit, when this power source unit breaks down at the same time as a short-circuit failure of the chip, a switching element of a different lower arm cannot be forcibly caused to allow conduction. For this reason, a large current flows in only the chip in which a short-circuit failure has occurred.

The present invention has been made in consideration of the problems described above, and an object thereof is to be able to miniaturize a gate driving power source device by sharing power source units and to prevent a large current from locally flowing in a single chip even when a short-circuit failure occurs in a multi-phase conversion circuit included in a power conversion device.

The present invention employs the following constitutions as means for resolving the foregoing problems.

(1) According to an aspect of the present invention, there is provided a gate driving power source device in which a plurality of upper arms and a plurality of lower arms are provided in each of a plurality of power conversion circuits including one or more multi-phase conversion circuits performing DC/AC power conversion or AC/DC power conversion and which supplies a DC power source to a plurality of gate drive circuits of each of the upper arms and each of the lower arms. The gate driving power source device includes a shared power source unit supplying the shared DC power source to the gate drive circuit driving any one of the plurality of lower arms of one of the multi-phase conversion circuits or any one of the plurality of upper arms of the multi-phase conversion circuits and the gate drive circuit driving the upper arms or the lower arms of other conversion circuits.

(2) In the gate driving power source device according to the foregoing (1), the shared power source unit may supply the DC power source to the gate drive circuits driving the lower arms of the multi-phase conversion circuits. The gate driving power source device may further include a plurality of DC power source circuits that are different from the shared power source unit and supply the DC power source to each of the gate drive circuits driving the upper arms of the multi-phase conversion circuits.

(3) In the gate driving power source device according to the foregoing (2), one multi-phase conversion circuit may have three or more lower arms. The gate driving power source device may further include a DC power source circuit that supplies the shared DC power source to the plurality of gate drive circuits, of three or more gate drive circuits of the gate drive circuits driving the three or more lower arms, to which the DC power source is not supplied from the shared power source unit.

(4) In the gate driving power source device according to any one of the foregoing (1) to the foregoing (3), the power conversion circuits may include a powering inverter constituted of the multi-phase conversion circuits and a step-up/down converter supplying step-up power to the powering inverter.

(5) In the gate driving power source device according to the foregoing (4), the shared power source unit may supply the shared DC power source to the gate drive circuit provided in any one of the plurality of lower arms of the powering inverter or any one of a plurality of upper arm switching elements of the powering inverter and the gate drive circuits provided in the upper arm switching elements or the lower arms of the step-up/down converter.

(6) In the gate driving power source device according to any one of the foregoing (1) to the foregoing (5), the plurality of gate drive circuits may be mounted on a single printed board. The shared power source unit may supply the shared DC power source to two adjacent gate drive circuits disposed on the printed board.

There is provided the shared power source unit supplying a shared DC power source to the gate drive circuit provided in any one of the plurality of lower arms of the multi-phase conversion circuit or any one of the plurality of upper arm switching elements of the multi-phase conversion circuits and the gate drive circuits provided in the upper arm switching elements or the lower arms of other power conversion circuits. Namely, in the present invention, compared to a case in which the power source unit is installed in each of the gate drive circuits provided in all the upper arms and the gate drive circuits provided in all the lower arms, the number of installed power source units can be reduced, and the gate driving power source device can be miniaturized.

In addition, the shared power source unit supplies the DC power source to the gate drive circuit provided in any one of the plurality of lower arms of the multi-phase conversion circuits or any one of the plurality of upper arms of the multi-phase conversion circuits. For this reason, the DC power source is supplied from a different power source unit to gate drive circuits provided in the lower arms and the upper arms to which the DC power source is not supplied from the shared power source unit of the multi-phase conversion circuit. For this reason, even when a short-circuit failure occurs in a chip provided with a switching element in the multi-phase conversion circuit and the power source unit supplying the DC power source to this chip breaks down at the same time, the DC power source can be supplied from a different power source unit (including the shared power source unit) to a chip in which no short-circuit failure has occurred, and the switching elements provided in chips in which no short-circuit failure has occurred can be forcibly caused to allow conduction. Therefore, a large current can be prevented from locally flowing in only a chip in which a short-circuit failure has occurred.

According to the present invention, a gate driving power source device can be miniaturized by sharing power source units, and a large current can be prevented from locally flowing in a single chip even when a short-circuit failure occurs in a multi-phase conversion circuit included in a power conversion device.

DETAILED DESCRIPTION OF THE INVENTION

Hereinafter, with reference to the drawings, embodiments of a gate driving power source device according to the present invention will be described.

First Embodiment

Figure 1:
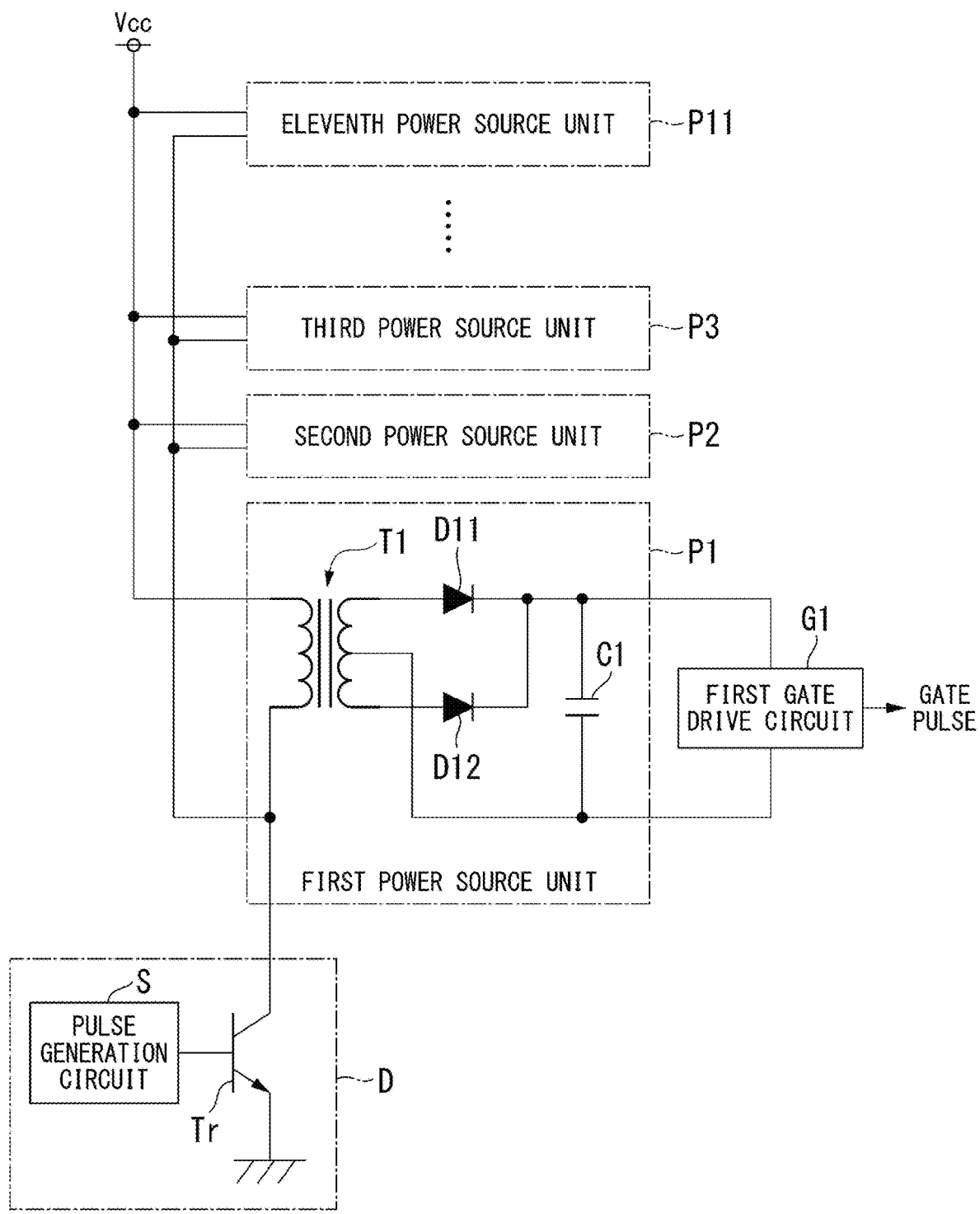
FIG. 1 is a circuit diagram illustrating a constitution of a gate driving power source device according to a first embodiment of the present invention.

FIG. 1 is a circuit diagram illustrating a constitution of a gate driving power source device according to a first embodiment of the present invention. As illustrated in FIG. 1, the gate driving power source device according to the first embodiment includes first to eleventh (eleven) power source units P1 to P11 and a single power source drive circuit D. A constitution in which each of the power source units P1 to P11 is provided with a power source drive circuit may be adopted. The first to eleventh (eleven) power source units P1 to P11 are DC power source circuits supplying a DC power source to first to sixteenth (sixteen in total) gate drive circuits G1 to G16 illustrated in FIG. 2. As illustrated in FIG. 1, an input side thereof is connected in parallel between an output side of the power source drive circuit D and a circuit power source Vcc (DC power source).

Figure 2:
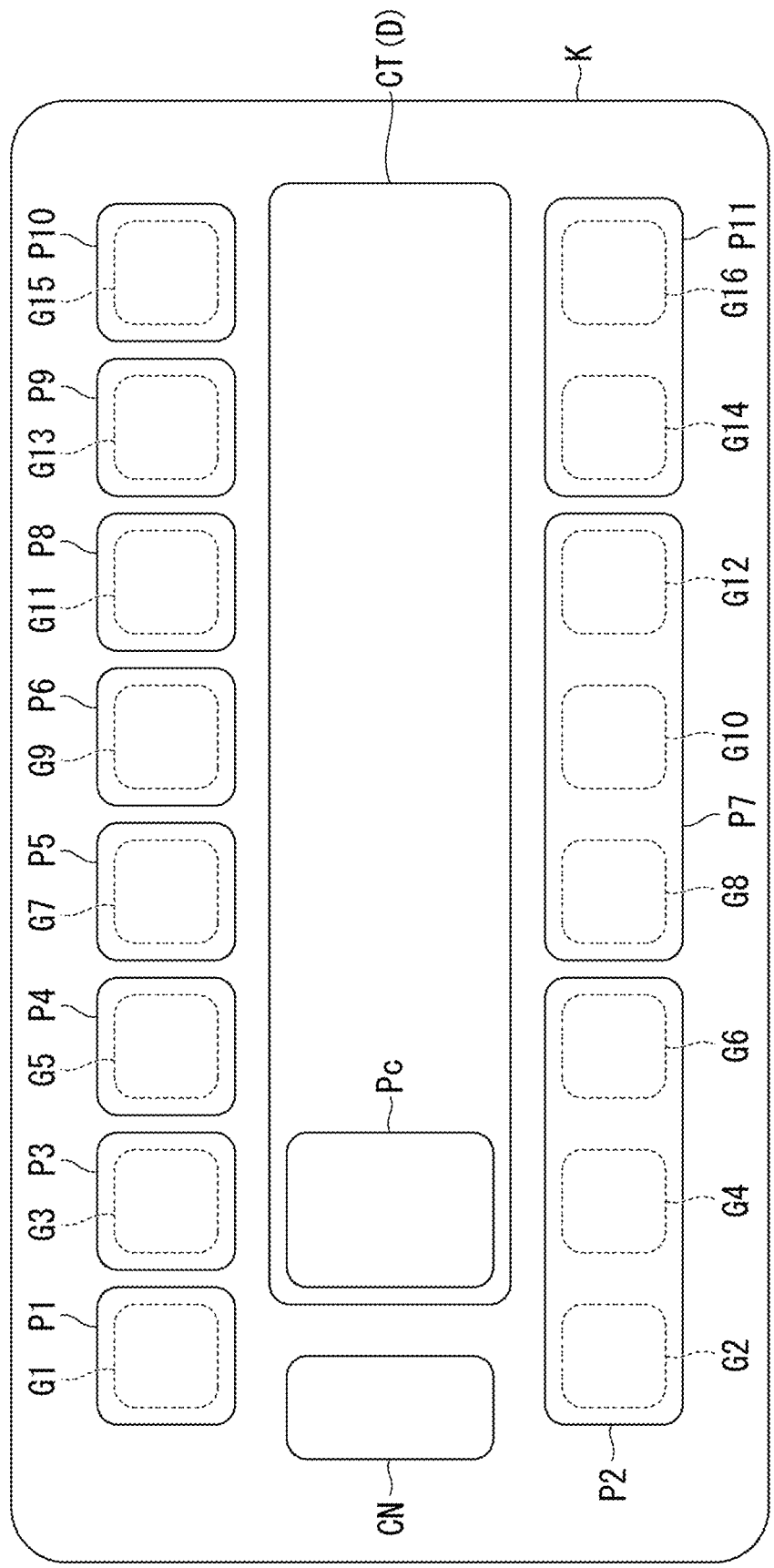
FIG. 2 is a schematic view illustrating a substrate layout in the first embodiment of the present invention.

For the sake of convenience, FIG. 1 illustrates only the detailed constitution of the first power source unit P1 supplying the DC power source to the first gate drive circuit G1. However, all the first to eleventh (eleven in total) power source units P1 to P11 have the same constitution. FIG. 2 is a schematic view illustrating a substrate layout in the first embodiment of the present invention. As illustrated in this diagram, the first power source unit P1 supplies the DC power source to the first gate drive circuit G1.

As illustrated in FIG. 2, the second power source unit P2 supplies the DC power source to three gate drive circuits. The second power source unit P2 supplies the DC power source to the second gate drive circuit G2, the fourth gate drive circuit G4, and the sixth gate drive circuit G6. The third power source unit P3 supplies the DC power source to the third gate drive circuit G3. The fourth power source unit P4 supplies the DC power source to the fifth gate drive circuit G5. The fifth power source unit P5 supplies the DC power source to the seventh gate drive circuit G7.

The sixth power source unit P6 supplies the DC power source to the ninth gate drive circuit G9. The seventh power source unit P7 supplies the DC power source to three gate drive circuits. The seventh power source unit P7 supplies the DC power source to the eighth gate drive circuit G8, the tenth gate drive circuit G10, and the twelfth gate drive circuit G12. The eighth power source unit P8 supplies the DC power source to the eleventh gate drive circuit G11. The ninth power source unit P9 supplies the DC power source to the thirteenth gate drive circuit G13.

The tenth power source unit P10 supplies the DC power source to the fifteenth gate drive circuit G15. The eleventh power source unit P11 supplies the DC power source to two gate drive circuits. The eleventh power source unit P11 supplies the DC power source to the fourteenth gate drive circuit G14 and the sixteenth gate drive circuit G16.

In the first to eleventh (eleven in total) power source units P1 to P11, the first power source unit P1, the third power source unit P3, the fourth power source unit P4, the fifth power source unit P5, the sixth power source unit P6, the eighth power source unit P8, the ninth power source unit P9, and the tenth power source unit P10 supply the DC power source to a single gate drive circuit. However, the second power source unit P2 supplies the DC power source to three gate drive circuits, the seventh power source unit P7 supplies the DC power source to three gate drive circuits, and the eleventh power source unit P11 supplies the DC power source to two gate drive circuits. The first, third, fourth, fifth, sixth, eighth, ninth, and tenth power source units P1, P3, P4, P5, P6, P8, P9, P10 correspond to individual power source units of the present invention. The seventh power source unit P7 corresponds to a shared power source unit of the present invention. The second power source unit P2 and the eleventh power source unit P11 correspond to the shared power source units within multi-phase conversion circuits of the present invention. The shared power source units are DC power source circuits.

Figure 3:
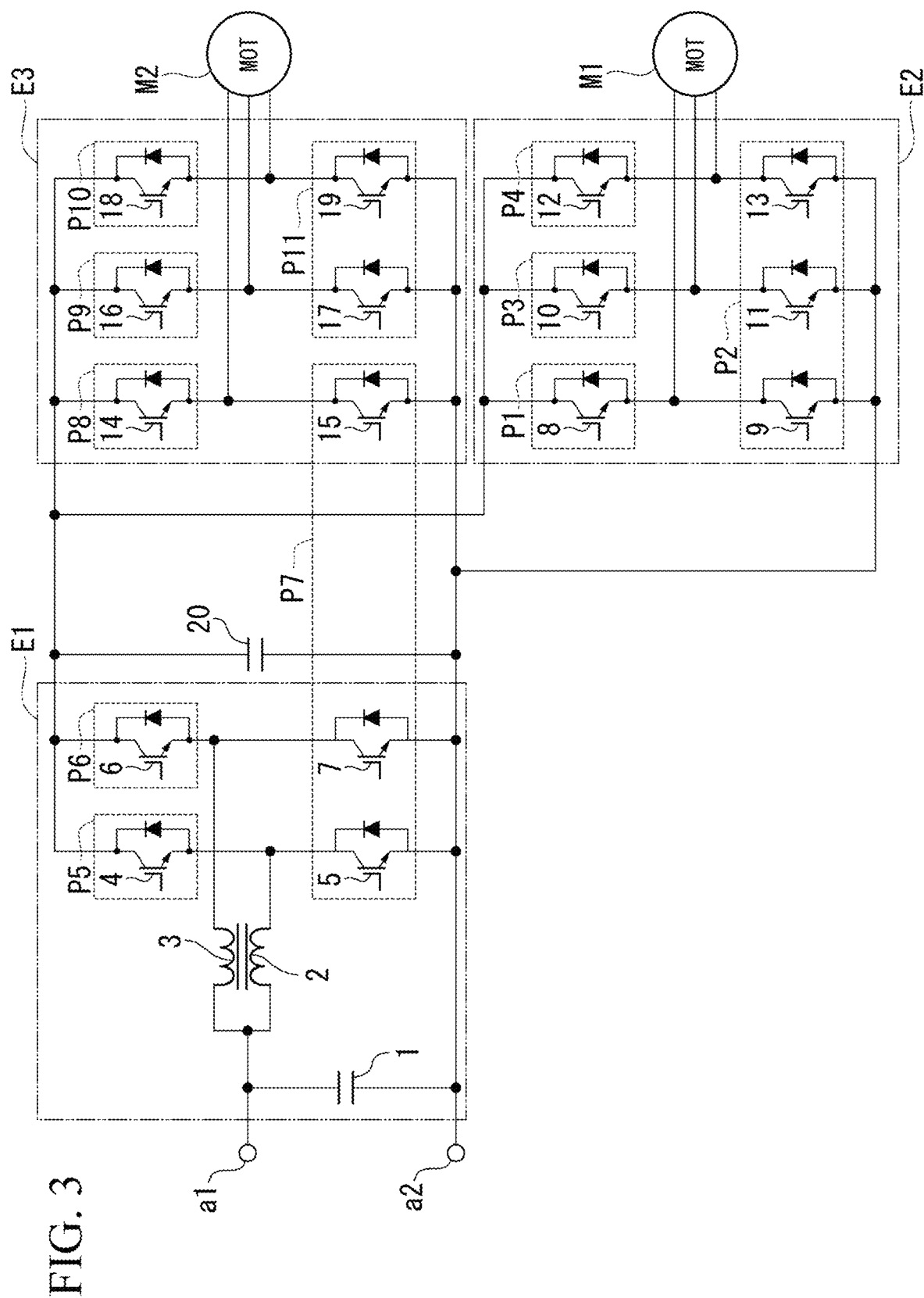
FIG. 3 is a schematic view illustrating a constitution of the gate driving power source device according to the first embodiment of the present invention and is a circuit diagram of power conversion circuits in the first embodiment.

FIG. 3 is a schematic view illustrating a constitution of the gate driving power source device according to the first embodiment of the present invention and is a circuit diagram of power conversion circuits in the first embodiment. The gate drive circuits G1 to G16 (sixteen in total) are drive circuits driving the power conversion devices illustrated in FIG. 3. These power conversion devices are PCUs (power control units) mounted in a vehicle, for example, and have a step-up/down converter E1, a power generation converter E2, and a traveling inverter E3 (powering inverter). The step-up/down converter E1, the power generation converter E2, and the traveling inverter E3 correspond to the power conversion circuits of the present invention. The traveling inverter E3 corresponds to the multi-phase conversion circuit of the present invention.

In such a power conversion device, the first to sixth gate drive circuits G1 to G6 described above drive the power generation converter E2. The seventh to tenth gate drive circuit G7 to G10 drive the step-up/down converter E1. The eleventh to sixteenth gate drive circuits G11 to G16 drive the traveling inverter E3.

The step-up/down converter E1 is a bidirectional step up/down circuit and includes a first smoothing capacitor 1, a first reactor 2, a second reactor 3, upper arm switching elements 4 and 6 (upper arms), and lower arm switching elements 5 and 7 (lower arms), as illustrated in FIG. 3.

This step-up/down converter E1 has a stepping-up function of stepping up first DC power input to input/output ends a1 and a2 from the outside and outputting second DC power (stepped-up power) to the traveling inverter E3. The step-up/down converter E1 has a stepping-down function of stepping down the second DC power input from the power generation converter E2 or/and the traveling inverter E3 and outputting the first DC power (stepped-down power) to the input/output ends a1 and a2. The step-up/down converter E1 has the stepping-up function and the stepping-down function. For example, the input/output end a1 has a high potential, and the input/output end a2 has a low potential. The upper arm switching elements 4 and 6 and the lower arm switching elements 5 and 7 are insulated gate bipolar transistors (IGBTs), for example, and each of them is made into a chip, for example. For example, a switching element made into a chip is a surface mounting component.

In the step-up/down converter E1, the first smoothing capacitor 1 is a smoothing capacitor for smoothing a voltage of the first DC power input to the input/output ends a1 and a2 from the outside. The first reactor 2 and the second reactor 3 are magnetically coupled to each other. In the first reactor 2, one end is connected to one end of the first smoothing capacitor 1, and the other end is connected to a connection point between the upper arm switching element 4 and the lower arm switching element 5. In the second reactor 3, one end is connected to one end of the first smoothing capacitor 1, and the other end is connected to a connection point between the upper arm switching element 6 and the lower arm switching element 7. The upper arm switching element 4 and the lower arm switching element 5 are connected to each other, and the upper arm switching element 6 and the lower arm switching element 7 are connected to each other.

The upper arm switching element 4 is driven by the seventh gate drive circuit G7 which receives supply of a power source from the fifth power source unit P5. The lower arm switching element 5 is driven by the eighth gate drive circuit G8 which receives supply of a power source from the seventh power source unit P7.

The upper arm switching element 6 is driven by the ninth gate drive circuit G9 which receives supply of a power source from the sixth power source unit P6. The lower arm switching element 7 is driven by the tenth gate drive circuit G10 which receives supply of a power source from the seventh power source unit P7.

The power generation converter E2 is a three-phase converter having a power generation motor M1 as a power supply source and includes three upper arm switching elements 8, 10, and 12 and three lower arm switching elements 9, 11, and 13. This power generation converter E2 performs AC/DC power conversion of AC power input from the power generation motor M1 into DC power and outputs it to the step-up/down converter E1. The power generation motor M1 is a motor functioning as an AC generator.

In this power generation converter E2, the upper arm switching element 8 and the lower arm switching element 9 constitute a first switching leg. The upper arm switching element 10 and the lower arm switching element 11 constitute a second switching leg. The upper arm switching element 12 and the lower arm switching element 13 constitute a third switching leg.

In the power generation converter E2, the upper arm switching element 8 is driven by the first gate drive circuit G1 which receives supply of a power source from the first power source unit P1. The lower arm switching element 9 is driven by the second gate drive circuit G2 which receives supply of a power source from the second power source unit P2.

The upper arm switching element 10 is driven by the third gate drive circuit G3 which receives supply of a power source from the third power source unit P3. The lower arm switching element 11 is driven by the fourth gate drive circuit G4 which receives supply of a power source from the second power source unit P2.

The upper arm switching element 12 is driven by the fifth gate drive circuit G5 which receives supply of a power source from the fourth power source unit P4. The lower arm switching element 13 is driven by the sixth gate drive circuit G6 which receives supply of a power source from the second power source unit P2. The upper arm switching elements 8, 10, and 12 and the lower arm switching elements 9, 11, and 13 are IGBTs, for example, and each of them is made into a chip, for example.

The traveling inverter E3 is a three-phase inverter (multi-phase conversion circuit) driven by having a traveling motor M2 as a load and includes three upper arm switching elements 14, 16, and 18 and three lower arm switching elements 15, 17, and 19. This power generation converter E2 performs DC/AC power conversion of the second DC power input from the step-up/down converter E1 to second AC power and outputs it to the traveling motor M2. The traveling motor M2 is a motor driving wheels.

In this traveling inverter E3, the upper arm switching element 14 and the lower arm switching element 15 constitute a fourth switching leg. In addition, the upper arm switching element 16 and the lower arm switching element 17 constitute a fifth switching leg. Moreover, the upper arm switching element 18 and the lower arm switching element 19 constitute a sixth switching leg.

In such a traveling inverter E3, the upper arm switching element 14 is driven by the eleventh gate drive circuit G11 which receives supply of a power source from the eighth power source unit P8. The lower arm switching element 15 is driven by the twelfth gate drive circuit G12 which receives supply of a power source from the seventh power source unit P7.

In addition, the upper arm switching element 16 is driven by the thirteenth gate drive circuit G13 which receives supply of a power source from the ninth power source unit P9. The lower arm switching element 17 is driven by the fourteenth gate drive circuit G14 which receives supply of a power source from the eleventh power source unit P11.

Moreover, the upper arm switching element 18 is driven by the fifteenth gate drive circuit G15 which receives supply of a power source from the tenth power source unit P10. The lower arm switching element 19 is driven by the sixteenth gate drive circuit G16 which receives supply of a power source from the eleventh power source unit P11. The upper arm switching elements 14, 16, and 18 and the lower arm switching elements 15, 17, and 19 are IGBTs, for example, and each of them is made into a chip, for example.

Such a power conversion device includes a second smoothing capacitor 20 for outputting the second DC power. In the second smoothing capacitor 20, one end is connected to one output side in the step-up/down converter E1, and the other end is connected to the other output side in the step-up/down converter E1. The second smoothing capacitor 20 smooths an output of the step-up/down converter E1.

The power source drive circuit D includes a pulse generation circuit S and a drive transistor Tr. The pulse generation circuit S generates a pulse signal in a predetermined cycle at a predetermined duty ratio and outputs it to a base terminal of the drive transistor Tr. In the drive transistor Tr, the base terminal is connected to the output side of the pulse generation circuit S, an emitter terminal is earthed, and a collector terminal is connected to one end of a primary winding in a transformer T1. Such a power source drive circuit D applies pulsed power (pulse power) to the input sides of the first to eleventh power source units P1 to P11, namely, the primary winding of each of the transformers of the first to eleventh power source units P1 to P11 connected to each other in series.

The first power source unit P1 transforms a voltage of pulse power applied to the primary winding of the transformer T1 by the power source drive circuit D through the transformer T1 and rectifies it through a rectification circuit. The first power source unit P1 generates DC power having a predetermined voltage and outputs it to the gate drive circuit G1 from both ends of a rectification capacitor C1. Similar to the first power source unit P1, the remaining second to eleventh power source units P2 to P11 transform a voltage of pulse power applied to the primary winding of the transformer T1 by the power source drive circuit D through the transformer and rectify it through the rectification circuits. The second to eleventh power source units P2 to P11 generate DC power having a predetermined voltage and output it to the second to sixteenth gate drive circuits G2 to G16 from both ends of the rectification capacitors.

The gate drive circuits G1 to G16 (sixteen in total) described above are controlled in a unified manner by a control circuit CT illustrated in FIG. 2. A relationship of receiving and supplying DC power between the first to eleventh power source units P1 to P11 and the first to sixteenth gate drive circuits G1 to G16 is as described above. The first to eleventh power source units P1 to P11, the first to sixteenth gate drive circuits G1 to G16, and the control circuit CT are mounted on a single printed board K as illustrated in FIG. 2. The first to sixteenth gate drive circuits G1 to G16 and the control circuit CT can also be mounted on a substrate different from the first to eleventh power source units P1 to P11. In this case, for example, the power source drive circuit D is installed at the position of the control circuit CT.

The first, third, fourth, fifth, sixth, eighth, ninth, and eleventh power source units P1, P3, P4, P5, P6, P8, P9, and P11 which supply the DC power source to the first, third, fifth, seventh, ninth, eleventh, thirteenth, and fifteenth gate drive circuits G1, G3, G5, G7, G9, G11, G13, and G15 driving the upper arm switching elements 4, 6, 8, 10, 12, 14, 16, and 18; the second power source unit P2 which supplies the DC power source to the second, fourth, and sixth gate drive circuits G2, G4, and G6 driving the lower arm switching elements 9, 11, and 13; the seventh power source unit P7 which supplies the DC power source to the eighth, tenth, and twelfth gate drive circuits G8, G10, and G12 driving the lower arm switching elements 5, 7, and 15; and the eleventh power source unit P11 which supplies the DC power source to the fourteenth and nineteenth gate drive circuits G14 and G19 driving the lower arm switching elements 17 and 19 are disposed (laid out) such that the control circuit CT (or the power source drive circuit D) is sandwiched therebetween.

In more detail, the control circuit CT (or the power source drive circuit D) is disposed in an elongated shape at a central portion along long sides with respect to the rectangular printed board K. A connector CN is disposed at an end portion of the control circuit CT (or the power source drive circuit D) for giving and receiving a power source and a signal with respect to the outside. When the gate drive circuits G1 to G16 and the control circuit CT are constituted of a single substrate, a power source circuit Pc generating a power source for the control circuit CT is mounted in the vicinity of the connector CN in the control circuit CT.

The first, third, fourth, fifth, sixth, eighth, ninth, and tenth power source units P1, P3, P4, P5, P6, P8, P9, and P10 are disposed in a row along the long sides of the printed board K on one side of the control circuit CT (or the power source drive circuit D). The second power source unit P2, the seventh power source unit P7, and the eleventh power source unit P11 are disposed in a row along the long sides of the printed board K on the other side of the control circuit CT (or the power source drive circuit D). The first, third, and fourth power source units P1, P3, and P4 are disposed in a state of facing the second power source unit P2 in a short side direction of the printed board K with the control circuit CT (or the power source drive circuit D) sandwiched therebetween. The fifth, sixth, and eighth power source units P5, P6, and P8 are disposed in a state of facing the seventh power source unit P7 in the short side direction of the printed board K with the control circuit CT (or the power source drive circuit D) sandwiched therebetween. The ninth and tenth power source units P9 and P10 are disposed in a state of facing the eleventh power source unit P11 in the short side direction of the printed board K with the control circuit CT (or the power source drive circuit D) sandwiched therebetween.

The printed board K is a multi-layer printed board in which pattern wirings are formed on at least both surfaces thereof. The first to sixteenth gate drive circuits G1 to G16 are mounted on one surface of the printed board K. The first to eleventh power source units P1 to P11 are mounted on the other surface of the printed board K. That is, the first to sixteenth gate drive circuits G1 to G16 and the first to eleventh power source units P1 to P11 which supply the DC power source to the first to sixteenth gate drive circuits G1 to G16 are mounted on the printed board K with a rear/front positional relationship therebetween.

More specifically, as illustrated in FIG. 2 the first gate drive circuit G1 and the first power source unit P1 are mounted with a rear/front positional relationship therebetween. The second, fourth, and sixth gate drive circuits G2, G4, and G6 and the second power source unit P2 are mounted with a rear/front positional relationship therebetween. The third gate drive circuit G3 and the third power source unit P3 are mounted with a rear/front positional relationship therebetween. The fifth gate drive circuit G5 and the fourth power source unit P4 are mounted with a rear/front positional relationship therebetween. The seventh gate drive circuit G7 and the fifth power source unit P5 are mounted with a rear/front positional relationship therebetween.

The ninth gate drive circuit G9 and the sixth power source unit P6 are mounted with a rear/front positional relationship therebetween. The eighth, tenth, and twelfth gate drive circuits G8, G10, and G12 and the seventh power source unit P7 are mounted with a rear/front positional relationship therebetween. The eleventh gate drive circuit G11 and the eighth power source unit P8 are mounted with a rear/front positional relationship therebetween. The thirteenth gate drive circuit G13 and the ninth power source unit P9 are mounted with a rear/front positional relationship therebetween. The fifteenth gate drive circuit G15 and the tenth power source unit P10 are mounted with a front/rear positional relationship therebetween. The fourteenth and sixteenth drive circuits G14 and G16 and the eleventh power source unit P11 are mounted with a front/rear positional relationship therebetween.

Details of elements of the first to eleventh power source units P1 to P11 will be described with reference to FIG. 1. All the first to eleventh power source units P1 to P11 have the same constitution. Hereinafter, a detailed constitution of the first power source unit P1 will be representatively described.

The first power source unit P1 includes the transformer T1, a pair of diodes D11 and D12, and the rectification capacitor C1. The transformer T1 is a transformer including a primary winding and a secondary winding. In this transformer T1, one end of the primary winding is connected to the output side of the power source drive circuit D, and the other end of the primary winding is connected to one input end of the second power source unit P2, namely, one end of the primary winding in a transformer (not illustrated) of the second power source unit P2.

In this transformer T1, one end of the secondary winding is connected to an anode terminal of the diode D11 on one side, and the other end of the secondary winding is connected to an anode terminal of the diode D12 on the other side. In this transformer T1, an intermediate tap of the secondary winding is connected to the other end of the rectification capacitor C1.

In the diode D11 on one side between the pair of diodes D11 and D12, the anode terminal is connected to one end of the secondary winding of the transformer T1, and a cathode terminal is connected to the cathode terminal of the diode D12 on the other side and one end of the rectification capacitor C1. In the diode D12 on the other side, the anode terminal is connected to the other end of the secondary winding of the transformer T1, and the cathode terminal is connected to the cathode terminal of the diode D11 on one side and one end of the rectification capacitor C1.

In the rectification capacitor C1, one end is connected to each of the cathode terminals of the pair of diodes D11 and D12, and the other end is connected to the intermediate tap of the secondary winding in the transformer T1. Such a pair of diodes D11 and D12 and the rectification capacitor C1 constitute a rectification circuit which rectifies pulse power (pulse voltage) input from the secondary winding of the transformer T1 and converts it into DC power (DC voltage).

As illustrated in FIG. 2 and FIG. 3, this gate driving power source device includes the seventh power source unit P7 which supplies a shared DC power source to the twelfth gate drive circuit G12 provided in a manner of corresponding to the lower arm switching element 15 of the plurality of lower arm switching elements 15, 17, and 19 of the traveling inverter E3 and the eighth and tenth gate drive circuits G8 and G10 provided in a manner of corresponding to the lower arm switching elements 5 and 7 of the step-up/down converter E1.

Therefore, compared to a case in which the power source unit is installed in each of the first, third, fifth, seventh, ninth, eleventh, thirteenth, and fifteenth gate drive circuits G1, G3, G5, G7, G9, G11, G13, and G15 provided in a manner of corresponding to all the upper arm switching elements 4, 6, 8, 10, 12, 14, 16, and 18 in a one-to-one manner and the second, fourth, sixth, eighth, tenth, twelfth, fourteenth, and sixteenth gate drive circuits G2, G4, G6, G8, G10, G12, G14, and G16 provided in a manner of corresponding to all the lower arm switching elements 5, 7, 9, 11, 13, 15, 17, and 19 in a one-to-one manner, the number of installed power source units can be reduced and the gate driving power source device can be miniaturized.

In this gate driving power source device, the seventh power source unit P7 supplies the shared DC power source to the twelfth gate drive circuit G12 provided in a manner of corresponding to the lower arm switching element 15 of the plurality of lower arm switching elements 15, 17, and 19 of the traveling inverter E3 and the eighth and tenth gate drive circuits G8 and G10 provided in a manner of corresponding to the lower arm switching elements 5 and 7 of the step-up/down converter E1. For this reason, the DC power source is supplied from the eleventh power source unit P11 (different power source unit) to the fourteenth and sixteenth gate drive circuits G14 and G16 provided in the lower arm switching elements 17 and 19 to which the DC power source is not supplied from the seventh power source unit P7 of the traveling inverter E3.

For example, even when a short-circuit failure occurs in any of a chip provided with the lower arm switching element 15, a chip provided with the lower arm switching element 17, and a chip provided with the lower arm switching element 19 in the traveling inverter E3 and the power source unit which supplies the DC power source to the gate drive circuit provided in a manner of corresponding to the lower arm switching element provided in the chip in which a short-circuit failure has occurred breaks down at the same time, the gate driving power source device can forcibly cause the switching element provided in the chip in which no short-circuit failure has occurred to allow conduction due to power of a different power source unit. The gate driving power source device can prevent a large current from locally flowing in only the chip in which a short-circuit failure has occurred.

For example, it is assumed that a short-circuit failure has occurred in the chip provided with the lower arm switching element 17 of the traveling inverter E3 and the eleventh power source unit P11 which supplies the DC power source to the fourteenth gate drive circuit G14 provided in a manner of corresponding to the lower arm switching element 17 breaks down at the same time. Even in this case, the gate driving power source device can forcibly cause the lower arm switching element 15 of the traveling inverter E3 to be in a conductive state by supplying the DC power source to the twelfth gate drive circuit G12 using the seventh power source unit P7. The gate driving power source device can prevent a current generated from the rotating traveling motor M2 from flowing in only the chip provided with the lower arm switching element 17 in which a short-circuit failure has occurred.

In addition, it is assumed that a short-circuit failure has occurred in the chip provided with the lower arm switching element 19 of the traveling inverter E3 and the eleventh power source unit P11 which supplies the DC power source to the sixteenth gate drive circuit G16 provided in a manner of corresponding to the lower arm switching element 19 breaks down at the same time. Even in this case, the gate driving power source device can forcibly cause the lower arm switching element 15 of the traveling inverter E3 to be in a conductive state by supplying the DC power source to the twelfth gate drive circuit G12 using the seventh power source unit P7. The gate driving power source device can prevent a current generated from the rotating traveling motor M2 from flowing in only the chip provided with the lower arm switching element 19 in which a short-circuit failure has occurred.

It is assumed that a short-circuit failure has occurred in the chip provided with the lower arm switching element 15 of the traveling inverter E3 and the seventh power source unit P7 which supplies the DC power source to the twelfth gate drive circuit G12 provided in a manner of corresponding to the lower arm switching element 15 breaks down at the same time. Even in this case, the gate driving power source device can forcibly cause the lower arm switching elements 17 and 19 of the traveling inverter E3 to be in a conductive state by supplying the DC power source to the fourteenth and sixteenth gate drive circuits G14 and G16 using the eleventh power source unit P11. The gate driving power source device can prevent a current generated from the rotating traveling motor M2 from flowing in only the chip provided with the lower arm switching element 15 in which a short-circuit failure has occurred.

As described above, the gate driving power source device can be miniaturized by sharing the power source units and a large current can be prevented from locally flowing in a single chip even when a short-circuit failure occurs in the traveling inverter E3 included in the power conversion device.

In the gate driving power source device, individual power source units are provided in the first, third, fifth, seventh, ninth, eleventh, thirteenth, and fifteenth gate drive circuits G1, G3, G5, G7, G9, G11, G13, and G15 provided in a manner of corresponding to the upper arm switching elements 4, 6, 8, 10, 12, 14, 16, and 18.

Even when a short-circuit failure occurs in any of the chips provided with the upper arm switching elements 4, 6, 8, 10, 12, 14, 16, and 18, the gate driving power source device can forcibly cause the remaining upper arm switching elements 4, 6, 8, 10, 12, 14, 16, and 18 to be in a conductive state.

In the traveling inverter E3, the shared DC power source is supplied from the eleventh power source unit P11 to the fourteenth and sixteenth gate drive circuits G14 and G16 provided in a manner of corresponding to the lower arm switching elements 17 and 19. The number of power source units P can be further reduced, and the gate driving power source device can be further miniaturized.

The seventh power source unit P7 supplies the shared DC power source to the twelfth gate drive circuit G12 provided in a manner of corresponding to the lower arm switching element 15 of the traveling inverter E3 and the eighth and tenth gate drive circuits G8 and G10 corresponding to the lower arm switching elements 5 and 7 of the step-up/down converter E1. Accordingly, in the present embodiment, the plurality of lower arm switching elements 15, 17, and 19 of the traveling inverter E3 can be driven by being divided into a plurality of power source units. This is because higher reliability is required for maintenance of traveling ability in a vehicle in comparison between maintenance of power generating ability and maintenance of traveling ability.

Figure 4:
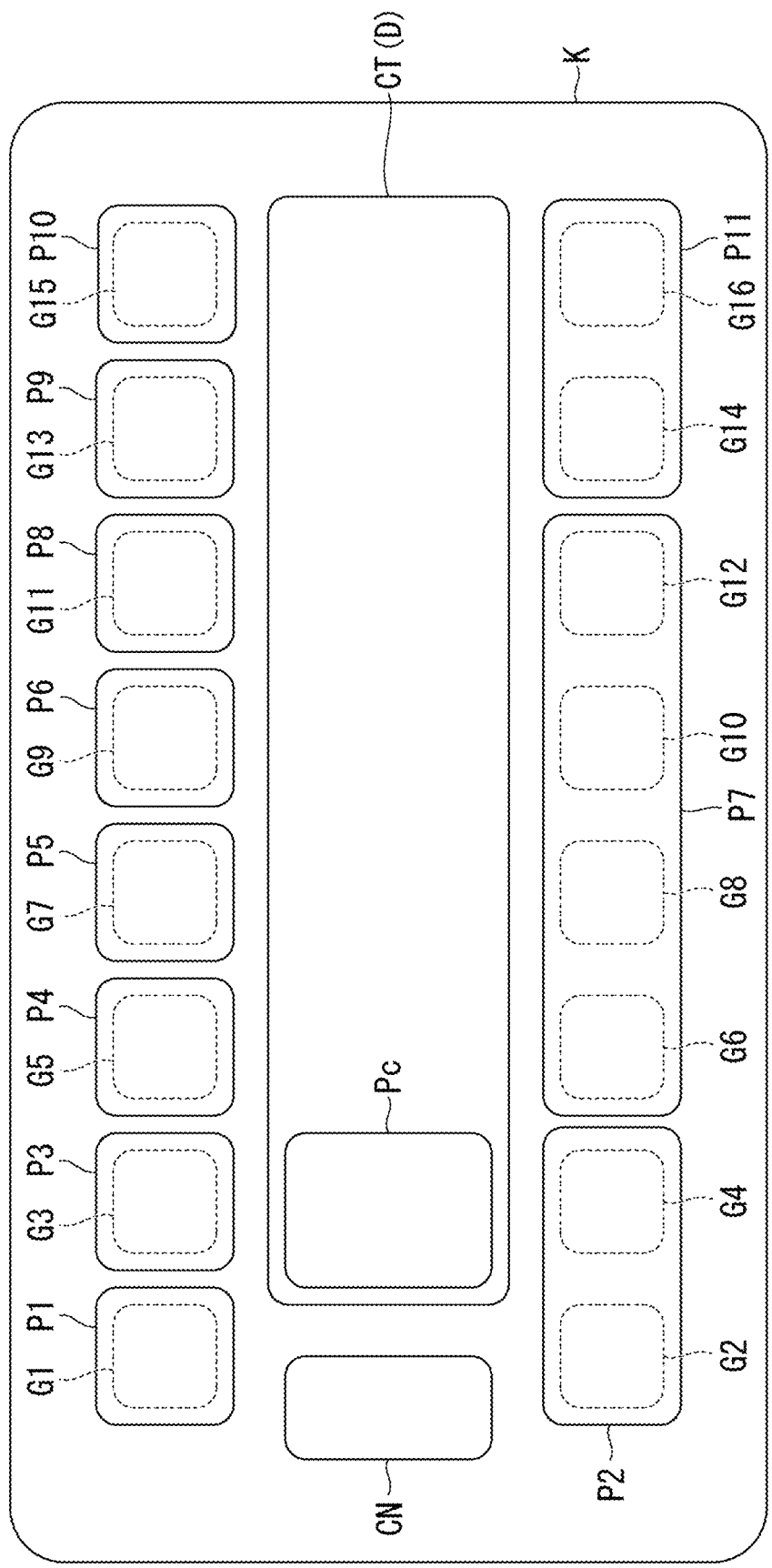
FIG. 4 is a schematic view illustrating a substrate layout in a modification example of the first embodiment of the present invention.

For example, when the power source unit has a performance capable of supplying power to four gate drive circuits, as illustrated in FIG. 4, the DC power source may be supplied to the sixth gate drive circuit G6 provided in a manner of corresponding to the lower arm switching element 13 of the power generation converter E2 using the seventh power source unit P7.

In such a case, for example, even when a short-circuit failure occurs in any of a chip provided with the lower arm switching element 9, a chip provided with the lower arm switching element 11, and a chip provided with the lower arm switching element 13 in the power generation converter E2 and the power source unit which supplies the DC power source to the gate drive circuit provided in a manner of corresponding to the lower arm switching element provided in the chip in which a short-circuit failure has occurred breaks down at the same time, the gate driving power source device can forcibly cause the lower arm switching element provided in the chip in which no short-circuit failure has occurred to allow conduction due to power of a different power source unit. The gate driving power source device can prevent a large current from locally flowing in only the chip in which a short-circuit failure has occurred.

For example, it is assumed that a short-circuit failure has occurred in the chip provided with the lower arm switching element 9 of the power generation converter E2 and the second power source unit P2 which supplies the DC power source to the second gate drive circuit G2 provided in a manner of corresponding to the lower arm switching element 9 breaks down at the same time. Even in this case, the gate driving power source device can forcibly cause the lower arm switching element 13 of the power generation converter E2 to be in a conductive state by supplying the DC power source to the sixth gate drive circuit G6 using the seventh power source unit P7. The gate driving power source device can prevent a current generated from the power generation motor M1 from flowing in only the chip provided with the lower arm switching element 9 in which a short-circuit failure has occurred.

It is assumed that a short-circuit failure has occurred in the chip provided with the lower arm switching element 11 of the power generation converter E2 and the second power source unit P2 which supplies the DC power source to the fourth gate drive circuit G4 provided in a manner of corresponding to the lower arm switching element 11 breaks down at the same time. Even in this case, the gate driving power source device can forcibly cause the lower arm switching element 13 of the power generation converter E2 to be in a conductive state by supplying the DC power source to the sixth gate drive circuit G6 using the seventh power source unit P7. The gate driving power source device can prevent a current generated from the power generation motor M1 from flowing in only the chip provided with the lower arm switching element 11 in which a short-circuit failure has occurred.

It is assumed that a short-circuit failure has occurred in the chip provided with the lower arm switching element 13 of the power generation converter E2 and the seventh power source unit P7 which supplies the DC power source to the sixth gate drive circuit G6 provided in a manner of corresponding to the lower arm switching element 13 breaks down at the same time. Even in this case, the gate driving power source device can forcibly cause the lower arm switching elements 9 and 11 of the power generation converter E2 to be in a conductive state by supplying the DC power source to the second and fourth gate drive circuits G2 and G4 using the second power source unit P2. The gate driving power source device can prevent a current generated from the rotating power generation motor M1 from flowing in only the chip provided with the lower arm switching element 13 in which a short-circuit failure has occurred.

The gate driving power source device supplies the shared DC power source from one power source unit to adjacent gate drive circuits disposed on the printed board K. The gate driving power source device can curb increase in size of the power source units (in the present embodiment, the second power source unit P2, the seventh power source unit P7, and the eleventh power source unit P11) supplying a shared DC power source to a plurality of gate drive circuits.

Second Embodiment

Subsequently, a second embodiment of the present invention will be described. In description of the present embodiment, description of parts similar to those of the foregoing first embodiment will be omitted or simplified.

Figure 5:
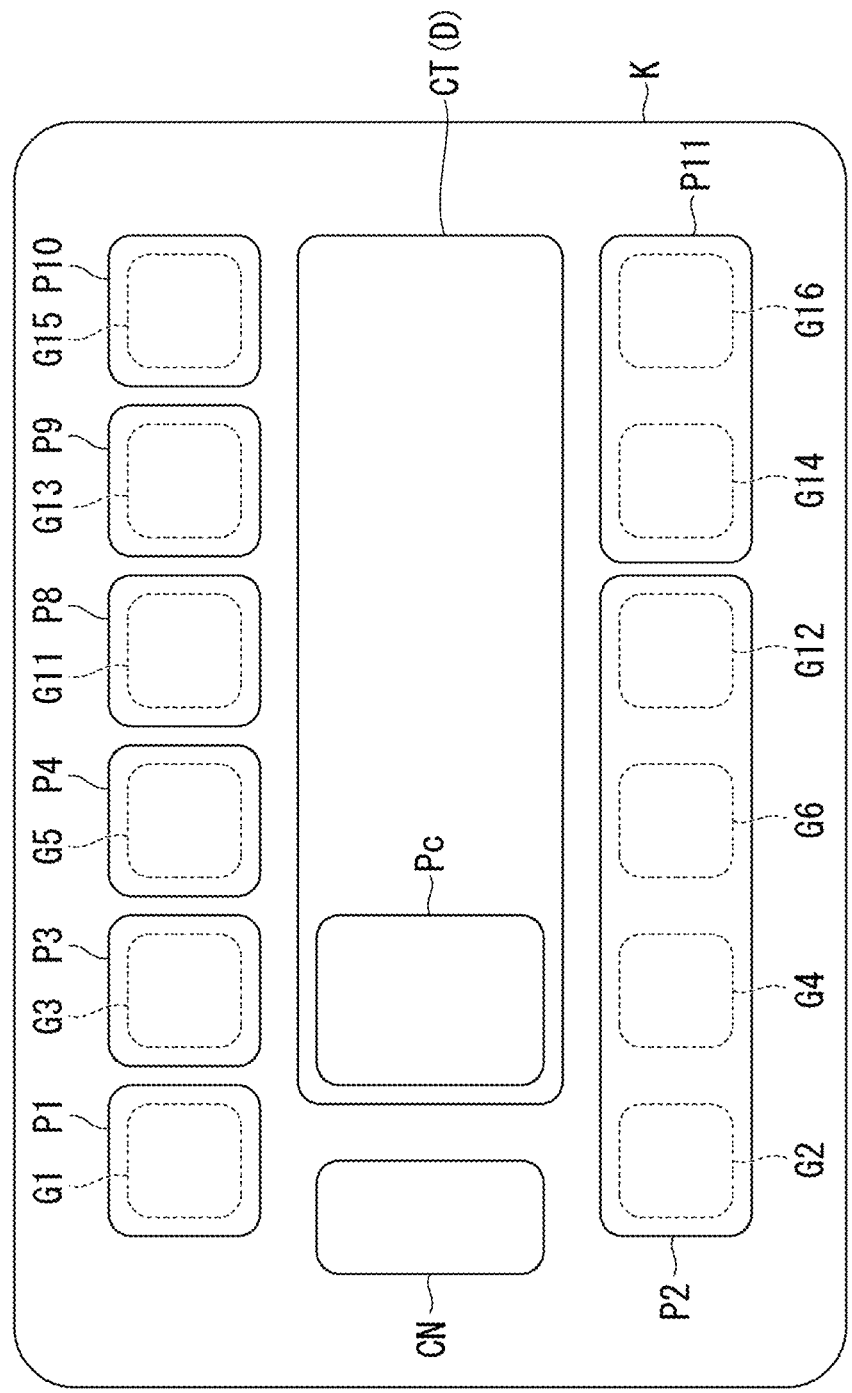
FIG. 5 is a schematic view illustrating a substrate layout in a second embodiment of the present invention.
Figure 6:
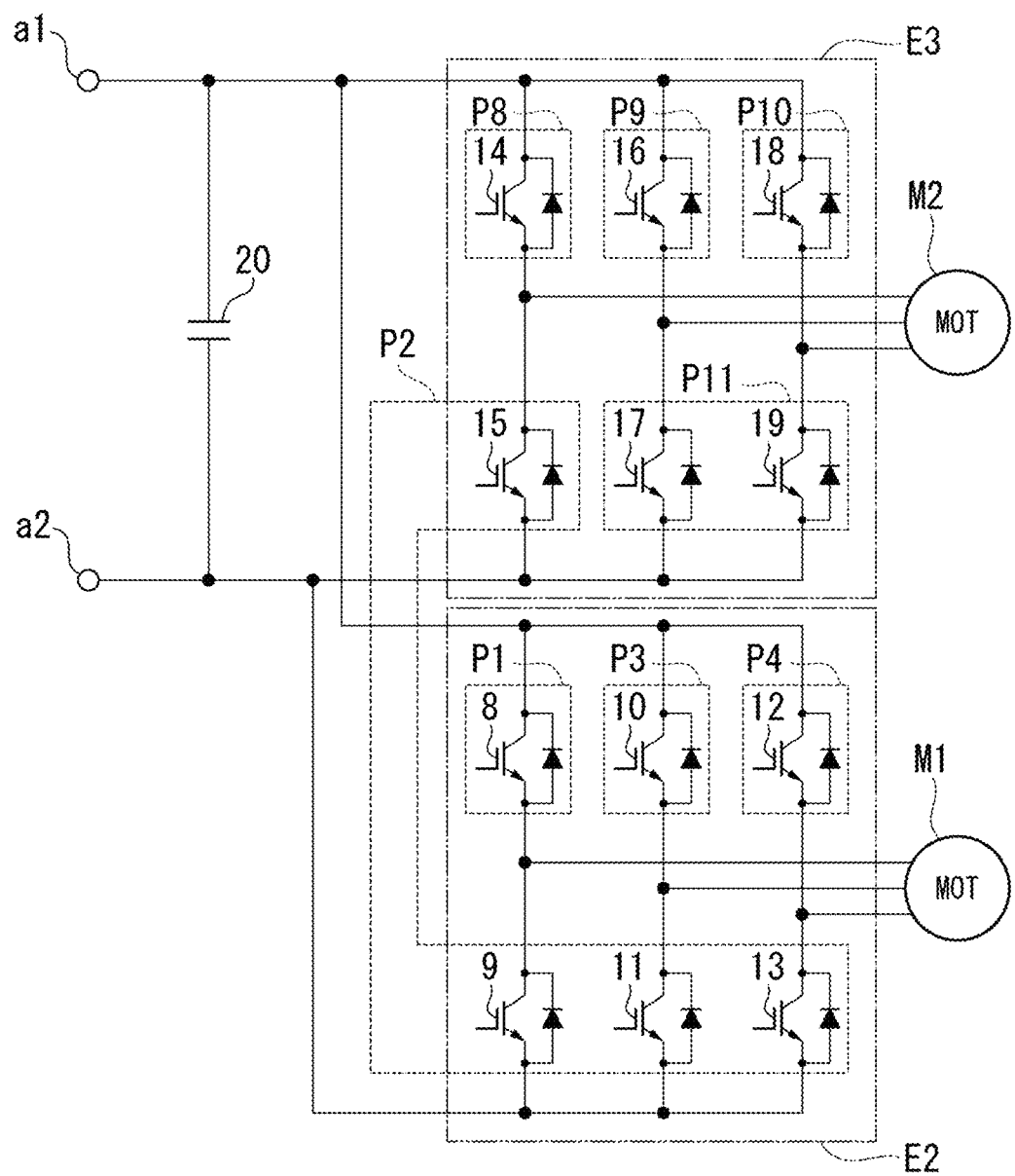
FIG. 6 is a schematic view illustrating a constitution of the gate driving power source device according to the second embodiment of the present invention and is a circuit diagram of the power conversion circuits in the second embodiment.

FIG. 5 is a schematic view illustrating a substrate layout in the second embodiment of the present invention. FIG. 6 is a schematic view illustrating a constitution of the gate driving power source device according to the second embodiment of the present invention and is a circuit diagram of the power conversion circuits in the second embodiment.

As illustrated in FIG. 5 and FIG. 6, in the present embodiment, the step-up/down converter E1 is not provided in the power conversion circuits, and the traveling inverter E3 and the power generation converter E2 are provided. Consequently, the gate driving power source device of the present embodiment does not include the fifth, sixth, and seventh power source units P5, P6, and P7. In the gate driving power source device of the present embodiment, the second power source unit P2 supplies the shared DC power source to the twelfth gate drive circuit G12 in addition to the second gate drive circuit G2, the fourth gate drive circuit G4, and the sixth gate drive circuit G6. In the present embodiment, the second power source unit P2 corresponds to the shared power source unit of the present invention.

This gate driving power source device includes the second power source unit P2. As illustrated in FIG. 5 and FIG. 6, the second power source unit P2 supplies the shared DC power source to the twelfth gate drive circuit G12 provided in a manner of corresponding to the lower arm switching element 15 of the plurality of lower arm switching elements 15, 17, and 19 of the traveling inverter E3 and the second, fourth, and sixth gate drive circuits G2, G4, and G6 provided in a manner of corresponding to the lower arm switching elements 9, 11, and 13 of the power generation converter E2.

Compared to a case in which the power source unit is installed in each of the first, third, fifth, eleventh, thirteenth, and fifteenth gate drive circuits G1, G3, G5, G11, G13, and G15 provided in a manner of corresponding to all the upper arm switching elements 8, 10, 12, 14, 16, and 18 and the second, fourth, sixth, twelfth, fourteenth, and sixteenth gate drive circuits G2, G4, G6, G12, G14, and G16 provided in a manner of corresponding to all the lower arm switching elements 9, 11, 13, 15, 17, and 19, the number of installed power source units can be reduced. Therefore, the gate driving power source device can be miniaturized.

In this gate driving power source device, the second power source unit P2 supplies the shared DC power source to the twelfth gate drive circuit G12 provided in a manner of corresponding to the lower arm switching element 15 of the plurality of lower arm switching elements 15, 17, and 19 of the traveling inverter E3 and the second, fourth, and sixth gate drive circuits G2, G4, and G6 provided in a manner of corresponding to the lower arm switching elements 9, 11, and 13 of the power generation converter E2.

For this reason, the DC power source is supplied from the eleventh power source unit P11 (different power source unit) to the fourteenth and sixteenth gate drive circuits G14 and G16 provided in a manner of corresponding to the lower arm switching elements 17 and 19 to which the DC power source is not supplied from the second power source unit P2 of the traveling inverter E3.

For this reason, for example, even when a short-circuit failure occurs in any of a chip provided with the lower arm switching element 15, a chip provided with the lower arm switching element 17, and a chip provided with the lower arm switching element 19 in the traveling inverter E3 and the power source unit which supplies the DC power source to the gate drive circuit provided in a manner of corresponding to the lower arm switching element provided in the chip in which a short-circuit failure has occurred breaks down at the same time, it is possible to forcibly cause the switching element provided in the chip in which no short-circuit failure has occurred to allow conduction due to power of a different power source unit. Therefore, a large current can be prevented from locally flowing in only the chip in which a short-circuit failure has occurred.

For example, it is assumed that a short-circuit failure has occurred in the chip provided with the lower arm switching element 17 of the traveling inverter E3 and the eleventh power source unit P11 which supplies the DC power source to the fourteenth gate drive circuit G14 driving the lower arm switching element 17 breaks down at the same time. Even in this case, the lower arm switching element 15 of the traveling inverter E3 can be forcibly caused to be in a conductive state by supplying the DC power source to the twelfth gate drive circuit G12 using the second power source unit P2. A current generated from the rotating traveling motor M2 can be prevented from flowing in only the chip provided with the lower arm switching element 17 in which a short-circuit failure has occurred.

In addition, it is assumed that a short-circuit failure has occurred in the chip provided with the lower arm switching element 19 of the traveling inverter E3 and the eleventh power source unit P11 which supplies the DC power source to the sixteenth gate drive circuit G16 provided in a manner of corresponding to the lower arm switching element 19 breaks down at the same time. Even in this case, the lower arm switching element 15 of the traveling inverter E3 can be forcibly caused to be in a conductive state by supplying the DC power source to the twelfth gate drive circuit G12 using the second power source unit P2. Therefore, a current generated from the rotating traveling motor M2 can be prevented from flowing in only the chip provided with the lower arm switching element 19 in which a short-circuit failure has occurred.

Moreover, it is assumed that a short-circuit failure has occurred in the chip provided with the lower arm switching element 15 of the traveling inverter E3 and the second power source unit P2 which supplies the DC power source to the twelfth gate drive circuit G12 provided in a manner of corresponding to the lower arm switching element 15 breaks down at the same time. Even in this case, the lower arm switching elements 17 and 19 of the traveling inverter E3 can be forcibly caused to be in a conductive state by supplying the DC power source to the fourteenth and sixteenth gate drive circuits G14 and G16 using the eleventh power source unit P11. Therefore, a current generated from the rotating traveling motor M2 can be prevented from flowing in only the chip provided with the lower arm switching element 15 in which a short-circuit failure has occurred.

As described above, according to the gate driving power source device, it can be miniaturized by sharing the power source units and a large current can be prevented from locally flowing in a single chip even when a short-circuit failure occurs in the traveling inverter E3 included in the power conversion device.

Hereinabove, favorable embodiments of the present invention have been described with reference to the accompanying drawings. However, it is a matter of course that the present invention is not limited to the foregoing embodiments. All the shapes, combinations, and the like of the respective constituent members illustrated in the embodiments described above are examples, and various changes can be made based on the requirement of design or the like within a range not departing from the gist of the present invention.

For example, in the foregoing embodiments, a constitution of a shared power source unit supplying the DC power source to the gate drive circuit provided in a manner of corresponding to the lower arm switching element has been described. However, the present invention is not limited to this. A constitution of a shared power source unit supplying the DC power source to the gate drive circuit provided in the upper arm switching element can also be employed.

In addition, the present invention can also be applied to a constitution in which a traveling assistance motor is installed in place of the power generation motor M1 and a traveling assistance converter is provided in place of the power generation converter E2. Moreover, in the foregoing embodiments, constitutions in which the number of conversion circuits is two or three have been described, but the present invention can also be applied to a constitution including four or more conversion circuits.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

E1 Step-up/down converter (conversion circuit)
E2 Power generation converter
E3 Traveling inverter (multi-phase conversion circuit)
G1 First gate drive circuit
G2 Second gate drive circuit
G3 Third gate drive circuit
G4 Fourth gate drive circuit
G5 Fifth gate drive circuit
G6 Sixth gate drive circuit
G7 Seventh gate drive circuit
G8 Eighth gate drive circuit
G9 Ninth gate drive circuit
G10 Tenth gate drive circuit
G11 Eleventh gate drive circuit
G12 Twelfth gate drive circuit
G13 Thirteenth gate drive circuit
G14 Fourteenth gate drive circuit
G15 Fifteenth gate drive circuit
G16 Sixteenth gate drive circuit
K Printed board
M1 Power generation motor
M2 Traveling motor
P1 First power source unit
P2 Second power source unit
P3 Third power source unit
P4 Fourth power source unit
P5 Fifth power source unit
P6 Sixth power source unit
P7 Seventh power source unit
P8 Eighth power source unit
P9 Ninth power source unit
P10 Tenth power source unit
P11 Eleventh power source unit
4, 6, 8, 10, 12, 14, 16, 18 Upper arm switching element
5, 7, 9, 11, 13, 15, 17, 19 Lower arm switching element

What is claimed is:

1. A gate driving power source device in which a plurality of upper arms and a plurality of lower arms are provided in each of a plurality of power conversion circuits including one or more multi-phase conversion circuits performing DC/AC power conversion or AC/DC power conversion and which supplies a DC power source to a plurality of gate drive circuits of each of the upper arms and each of the lower arms, the gate driving power source device comprising:
    a shared power source unit that is a first DC power source circuit supplying a first shared DC power source to a gate drive circuit driving any one of a plurality of lower arms of one multi-phase conversion circuit of the multi-phase conversion circuits or any one of a plurality of upper arms of the one multi-phase conversion circuit of the multi-phase conversion circuits and a gate drive circuit driving upper arms or lower arms of power conversion circuits other than the one multi-phase conversion circuit of the multi-phase conversion circuits.

2. The gate driving power source device according to claim 1,
    wherein the first shared power source unit supplies the first shared DC power source to the gate drive circuit driving any one of the plurality of lower arms of the one multi-phase conversion circuit of the multi-phase conversion circuits, and wherein the gate driving power source device further comprises a plurality of DC power source circuits that are different from the shared power source unit and supply a respective DC power source to each of the gate drive circuits driving the plurality of upper arms of the one multi-phase conversion circuit of the multi-phase conversion circuits.

3. The gate driving power source device according to claim 2, wherein each of the multi-phase conversion circuits has three or more lower arms, and wherein the gate driving power source device further comprises a second DC power source circuit that supplies a second shared DC power source to a plurality of gate drive circuits, of three or more gate drive circuits of the gate drive circuits driving three or more lower arms, wherein the second shared DC power source is not supplied from the shared power source unit.

4. The gate driving power source device according to claim 3, wherein the plurality of power conversion circuits include a powering inverter constituted of the one multi-phase conversion circuit of the multi-phase conversion circuits and a step-up/down converter supplying step-up power to the powering inverter, and wherein the shared power source unit supplies the first shared DC power source to a gate drive circuit driving any one of a plurality of lower arms of the powering inverter or any one of a plurality of upper arms of the powering inverter and a gate drive circuit driving the upper arms or the lower arms of the step-up/down converter.

5. The gate driving power source device according to claim 4, wherein the plurality of gate drive circuits are mounted on a single printed board, and wherein the shared power source unit supplies the first shared DC power source to two adjacent gate drive circuits of the plurality of gate drive circuits disposed on the single printed board.

6. The gate driving power source device according to claim 3, wherein the plurality of gate drive circuits are mounted on a single printed board, and wherein the shared power source unit supplies the first shared DC power source to two adjacent gate drive circuits of the plurality of gate drive circuits disposed on the single printed board.

7. The gate driving power source device according to claim 2, wherein the plurality of power conversion circuits include a powering inverter constituted of the one multi-phase conversion circuit of the multi-phase conversion circuits and a step-up/down converter supplying step-up power to the powering inverter, and wherein the shared power source unit supplies the first shared DC power source to a gate drive circuit driving any one of a plurality of lower arms of the powering inverter or any one of a plurality of upper arms of the powering inverter and a gate drive circuit driving the upper arms or the lower arms of the step-up/down converter.

8. The gate driving power source device according to claim 7, wherein the plurality of gate drive circuits are mounted on a single printed board, and wherein the shared power source unit supplies the first shared DC power source to two adjacent gate drive circuits of the plurality of gate drive circuits disposed on the single printed board.

9. The gate driving power source device according to claim 2, wherein the plurality of gate drive circuits are mounted on a single printed board, and wherein the shared power source unit supplies the first shared DC power source to two adjacent gate drive circuits of the plurality of gate drive circuits disposed on the single printed board.

10. The gate driving power source device according to claim 1, wherein the plurality of power conversion circuits include a powering inverter constituted of the one multi-phase conversion circuit of the multi-phase conversion circuits and a step-up/down converter supplying step-up power to the powering inverter, and wherein the shared power source unit supplies the first shared DC power source to a gate drive circuit driving any one of a plurality of lower arms of the powering inverter or any one of a plurality of upper arms of the powering inverter and a gate drive circuit driving the upper arms or the lower arms of the step-up/down converter.

11. The gate driving power source device according to claim 10, wherein the plurality of gate drive circuits are mounted on a single printed board, and wherein the shared power source unit supplies the first shared DC power source to two adjacent gate drive circuits of the plurality of gate drive circuits disposed on the single printed board.

12. The gate driving power source device according to claim 1, wherein the plurality of gate drive circuits are mounted on a single printed board, and wherein the shared power source unit supplies the first shared DC power source to two adjacent gate drive circuits of the plurality of gate drive circuits disposed on the single printed board.

* * * * *